Dec. 24, 1963  H. GROSS  3,114,915
MITTEN
Filed Nov. 20, 1962
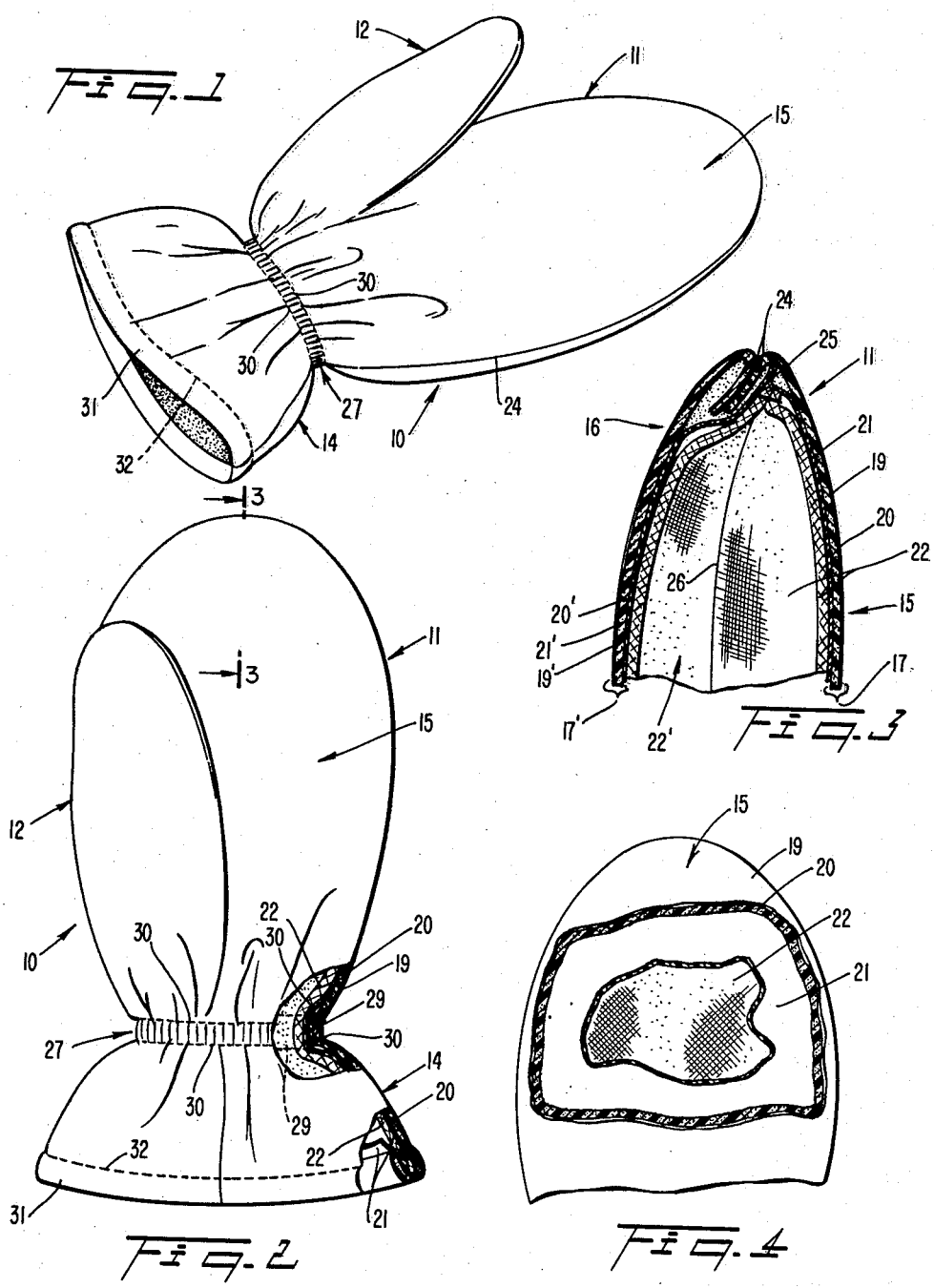
INVENTOR.
HERMAN GROSS
BY *Bauer and Seymour*
ATTORNEYS though the drawings are for the purpose of illustration only, and are not intended as a definition of the limits of the invention.

United States Patent Office 3,114,915
Patented Dec. 24, 1963

3,114,915
MITTEN
Herman Gross, 12 Jordan Drive, Great Neck, N.Y.
Filed Nov. 20, 1962, Ser. No. 238,954
11 Claims. (Cl. 2—158)

This invention relates to a novel hand covering such as a mitten or a glove.

The invention has among its objects the provision of a novel waterproof hand covering which provides warmth and flexibility.

A further object of the invention resides in the provision of a novel hand covering which readily adapts itself to the shape of the folded, partially unfolded, or unfolded hand, and which preserves such quality despite long use.

Still a further object of the invention lies in the provision of a hand covering which is particularly characterized by its durability, its attractiveness of appearance, and its economy of manufacture.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in perspective of an illustrative mitten made in accordance with the invention;

FIG. 2 is a view in elevation of the mitten of FIG. 1, portions of the mitten being shown broken away for clarity of illustration;

FIG. 3 is a fragmentary view in vertical section through the finger tip-receiving portion of the mitten, the section being taken generally along line 3—3 of FIG. 2; and FIG. 4 is a view in elevation of the finger tip-receiving portion of the mitten, the layers of material forming such portion being progressively broken away for clarity of illustration.

The illustrative embodiment of hand covering in accordance with the present invention is a mitten; such mitten is generally designated by the reference character 10. The mitten has a main palm and finger-covering portion 11, a thumb-covering portion 12, and a gauntlet or wrist-receiving portion 14. The body 11 of the mitten is made up of two opposed generally similar panels, the front panel being designated 15 and the rear panel 16. The materials making up such panels are more clearly shown in FIGS. 3 and 4. Since such panels are generally similar and are the same insofar as the character of the various layers thereof are concerned, the reference characters designating the various layers of material in the rear panel 16 are the same as those in the front panel 15 with the exception of an added prime.

The front panel 15 has a composite outer layer of material, which is generally designated 17. The composite layer 17 has a fabric outer layer 19, which may be made, for example, of a woven synthetic material such as cellulose acetate. The inner layer 20 of composite layer 17 is a thin flexible sheet of foamed plastic material such as foamed polyurethane, which adds greatly to the heat insulating properties of the mitten. The plastic layer 20 is bonded to the outer layer 19, as by being heat bonded thereto, a process which involves the superficial melting of the outer surface of plastic layer 20 followed by the pressing of fabric layer 19 against such partially melted surface of layer 20. The layers 19 and 20, however, may be secured together in other manners, as by being coated with adhesive and then pressed together.

The mitten incorporates an interposed layer of thin flexible, fluid-impervious, film or sheet material 21, 21' which may be made, for example, of polyvinyl chloride. Material 21, 21' has a smooth, and preferably glossy or at least semi-glossy opposite broad surfaces, for reasons to be discussed. Inwardly of layer 21, 21' the mitten has a knitted lining 22, 22' which may be fleeced on its inner surface. The composite outer layers 17 and 17' of the front and rear panels 15 and 16, respectively, of the mitten are stitched together along a seam 24 which extends along the edges of the panels. The opposing panel portions of the plastic films 21 and 21' are heat sealed together along a peripherally extending edge seam 25. The lining is likewise preferably made in two opposed panels 22 and 22', such panels also being secured together by a peripherally extending stitched seam 26.

The construction of the thumb portion 12 of the mitten is generally the same as that of the main body portion thereof and thus need not be specifically described. It will suffice to say that such thumb portion is made of two opposed parts each having a composite outer layer similar to the above described composite layers 17 and 17', an interposed plastic layer made up of panels similar to the above described panels 21 and 21' and an inner lining similar to that made up of lining panels 22 and 22', above described. The outer composite layer portion of the body portion 11 and the thumb portion 12 are secured together in a conventional manner as by stitching. The main body portion of the interposed plastic film layer and the thumb portion thereof are secured together as by being heat sealed, so that the body and thumb portions of such interposed layer form a fluid-impervious mitten-shaped member. The lining is formed as by stitching the thumb and main body portions thereof together.

After the composite outer layer of the mitten, the fluid-impervious interposed or intermediate layer thereof, and the lining have been formed as described, they are telescoped together in the relationship shown in FIGS. 3 and 4 and the interposed layer and the lining are secured to the composite outer layer of the mitten at the gauntlet portion 14 thereof. In the embodiment shown the composite outer layer, the waterproof interposed or intermediate layer, and the lining are unattached to each other except at the outer edge of the gauntlet portion. This is accomplished by turning of all such layers inwardly to form a welt or seam edge 31, the layers being secured together by a peripherally extending row of stitching 32.

In the illustrative mitten there is provided a peripherally extending constricted elastically yielding wrist engaging zone 27. Zone 27 is provided by positioning at zone 27 of the mitten an elastic tape 29 inwardly of the body formed by the composite outer layers 17 and 17' of the mitten, and by securing such body to the tape when the body is in gathered condition by one or more (two shown) rows of stitching 30. The interposed waterproof layer of the mitten is preserved in unpierced condition, unattached to the other layers of the mitten, at zone 27, such waterproof layer lying inwardly of the tape 29. Thus the stitching 30 penetrates only the outer composite layers 17, 17' of the mitten and the tape 29.

There is thus provided a waterproof mitten which is particularly characterized by its warmth, by its flexibility, and by the faithfulness with which it conforms both to the hand of the wearer and to the shape of an object grasped thereby through the mitten. The interposed fluid-impervious plastic film liner 21, 21' serves as a barrier to the passage of water or other fluid inwardly therethrough into the liner 22, 22'. The interposed plastic layer, however, has a still further, important function. Because the inner layer 20, 20' of the outer composite layer 17, 17' is made of foamed plastic material, it has a relatively high coefficient of friction, particularly with respect to the fabric lining 22, 22'. This follows from the facts that layer 20, 20' is rubber-like in character, and also that it is at least minutely rough, since it has a large number of pores in its inner surface. If such layer 20, 20' were to be in contact with the outer surface of the fabric lining 22, 22', the outer surface of which is naturally rough, there would be a pronounced tendency for the lining to be gathered at some locations within the outer body portion of the mitten, and for such linnig to remain in such condition. This action would follow from the bending or folding of the mitten during use; such bending and folding would not only locally distort the lining, but would tend to cause it to become at least temporarily adhered to the foamed plastic layer 20, 20' at locations of maximum pressure therebetween.

The interposed smooth surfaced plastic film layer 21, 21' has a low coefficient of friction with both the inner surface of the plastic layer 20, 20' and with the outer surface of the lining 22, 22', and thus neither the body nor the lining of the mitten tends to adhere or stick to the interposed plastic film. As a result, during the wearing of the mitten the various layers thereof, which are unsecured to each other except at the rear edge of the gauntlet portion, are free to shift relative to each other as required. This insures comfort during the wearing of the mitten and the avoidance of the imposition of undue localized stresses upon any of the layers of material making up the mitten. The interposed plastic layer 21, 21' thus provides freedom of movement betwen the various layers making up the mitten throughout the predominant part of the area thereof. Such freedom of movement is particularly important at the elastically yielding constricted zone 27 at the inner end of the gauntlet portion of the mitten. There the interposed plastic layer prevents adhesion of the lining 22, 22' to the inner, foamed plastic layer 20, 20' at such zone; this allows the lining to be expanded readily as the hand of the wearer is thrust into the mitten. Thus not only is the mitten easy to put on, but the comfort of the wearer of the mitten and the length of the useful life of the mitten are markedly improved.

The use of the interposed, fluid-impervious plastic layer 21, 21' adds but little to the cost of the finished hand covering, either from the standpoint of material cost or of added labor in making the hand covering. Thus panels forming such layer may be blanked out of a suitable plastic film or sheet material, and may be heat sealed together by conventional means. The plastic layer 21, 21' is readily assembled with the outer body and lining portions of the hand covering, and is easily secured thereto as by the described stitched seam at the outer edge of the gauntlet of the hand covering.

Although only one embodiment of the invention has been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A hand covering comprising a flexible outer body having front and back panels and a gauntlet portion, said outer body having its inner surface made of material having a relatively high co-efficient of friction, a lining attached to said gauntlet portion of the body and disposed within the body to receive at least a part of the hand therewithin, the attachment of the lining to the body being such as to leave the major part of the lining free for movement within the body, and a layer of thin flexible sheet material interposed between the lining and the body of the hand covering and attached to such body and lining at said gauntlet portion, the interposed layer having a relatively low coefficient of friction with both the inner surface of the body and the outer surface of the lining, whereby the lining remains free from and unattached to the body throughout the major part of its extent so as to slide freely locally therewithin.

2. A hand covering comprising a flexible outer body having front and back panels and a gauntlet portion, said outer body having its inner surface made of at least minutely rough plastic material having a relatively high co-efficient of friction, a fabric lining attached to said gauntlet portion of the body and disposed within the body to receive at least a part of the hand therewithin, the attachment of the lining to the body being such as to leave the major part of the lining free for movement within the body, and a layer of thin flexible plastic material interposed between the lining and the body of the hand covering and attached to such body and lining at said gauntlet portion, the interposed layer having a relatively low co-efficient of friction with both the inner surface of the body and the outer surface of the lining, whereby the lining remains free from and unattached to the body throughout the major part of its extent so as to slide freely locally therewithin.

3. A water-proof mitten or the like having a hand-receiving opening comprising an outer laminated hand covering comprising an outermost lamina of woven fabric and an innermost lamina of flexible heat insulating material, a lining inserted into said outer covering to receive the hand therewithin, the attachment of the lining to said outer covering being such as to leave the major part of the lining free for movement within said covering, a flexible intermediate hand covering of fluid-impervious plastic sheet material inserted in said outer covering between the latter and said lining, said intermediate covering having a relatively low coefficient of friction with both the inner surface of said outer covering and the outer surface of said lining, whereby said intermediate covering and said lining remain free from and unattached to each other and said outer covering throughout the major part of their broad engageable surfaces so as to slide freely locally with respect to each other, and means for securing said coverings and lining together around said opening.

4. A water-proof mitten or the like comprising similar outer, intermediate and inner interfitting hand coverings each having an opening for receiving the hand, the broad surfaces of the intermediate covering being free of attachment or adherence to the adjacent broad surfaces of said inner and outer coverings, and means for securing said coverings together around said openings therein, the outer covering consisting of an outermost layer of woven fabric and a thin inner layer of foamed plastic, the broad adjacent surfaces of said layers being adhered together substantially throughout, the intermediate covering consisting of thin, flexible, substantially fluid-impervious sheet material having smooth inner and outer surfaces, and said inner covering consisting of a warmth-retaining woven fabric.

5. A mitten or the like as defined in claim 4, wherein the outer covering comprises front and back panels secured together at the peripheral edges and thereafter reversed to provide an internal seam.

6. A mitten or the like as defined in claim 4, wherein the intermediate covering comprises front and back panels of plastic sheet material, such as polyvinyl chloride, said panels having peripheral edges thereof heat-sealed together to form a fluid-impervious covering.

7. A mitten or the like as defined in claim 4, wherein the inner covering comprises front and back panels of knitted fabric secured together by stitching at peripheral edges to provide an external seam.

8. A mitten or the like as defined in claim 4, wherein said foamed plastic layer is polyurethane foam.

9. A mitten or the like having a hand-receiving opening comprising an outer laminated hand covering consisting of an outermost lamina of woven fabric and an innermost lamina of foamed plastic adhered substantially throughout its broad surface to said fabric, an intermediate hand covering similar to and slidably inserted within said outer covering, said intermediate cover consisting of thin, flexible plastic sheet material having smooth inner and outer surfaces, an inner hand covering of woven fabric similar ot and slidably insertable within said intermediate covering, and means for securing together the edges of said outer, intermediate and inner coverings around said opening.

10. A mitten or the like as defined in claim 9, wherein each of said coverings includes a gauntlet portion adapted to surround the wrist, and an elastic strip is secured to the gauntlet portion of only the outer covering to yieldably hold the latter in constricted gathered condition about the wrist.

11. A mitten or the like as defined in claim 9, wherein the fabric lamina of the outer covering is woven from threads of synthetic material, such as cellulose acetate.

References Cited in the file of this patent

UNITED STATES PATENTS

| | | |
|---|---|---|
| 1,280,421 | Diem | Oct. 1, 1918 |
| 2,151,448 | Steinberg | Mar. 21, 1939 |
| 2,810,131 | Kogut | Oct. 22, 1957 |